Oct. 11, 1960 H. L. RILEY ET AL 2,955,807
HEAT-EXCHANGE APPARATUS
Filed Aug. 2, 1954 6 Sheets-Sheet 5
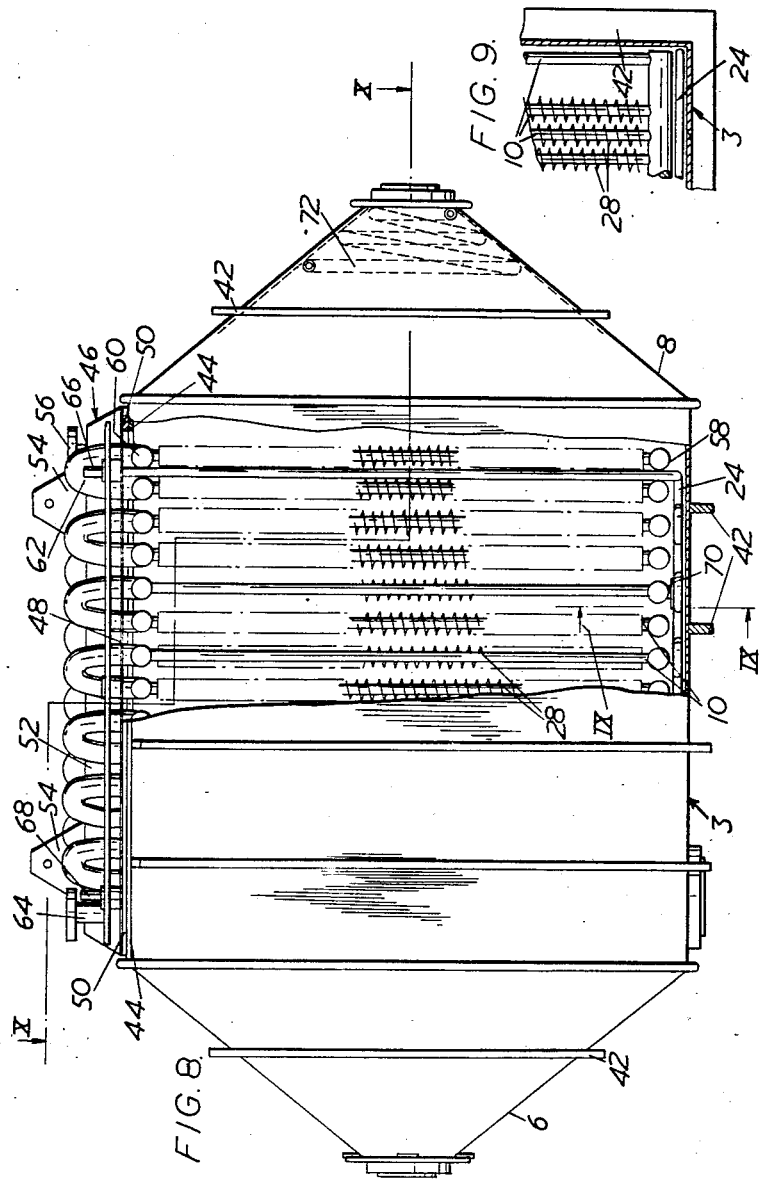
Inventors
Henry L. Riley
John Harris
Hauffe & Coates
By
Bailey, Stephens & Huettig
Attorneys

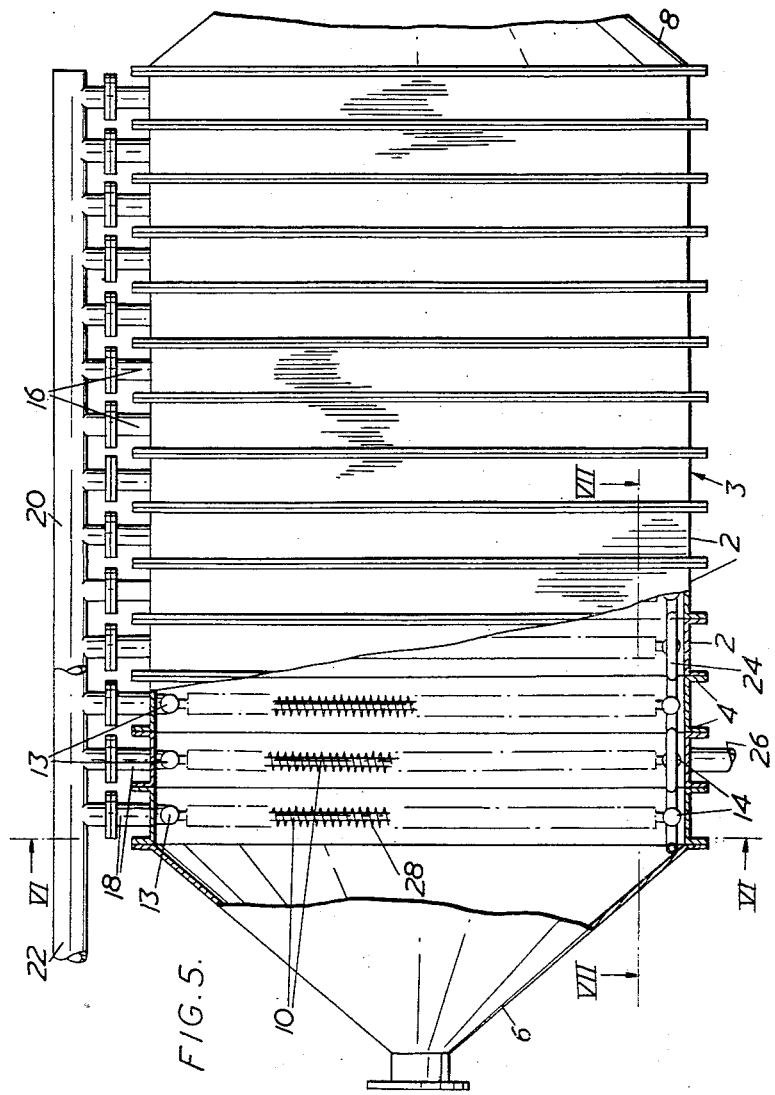

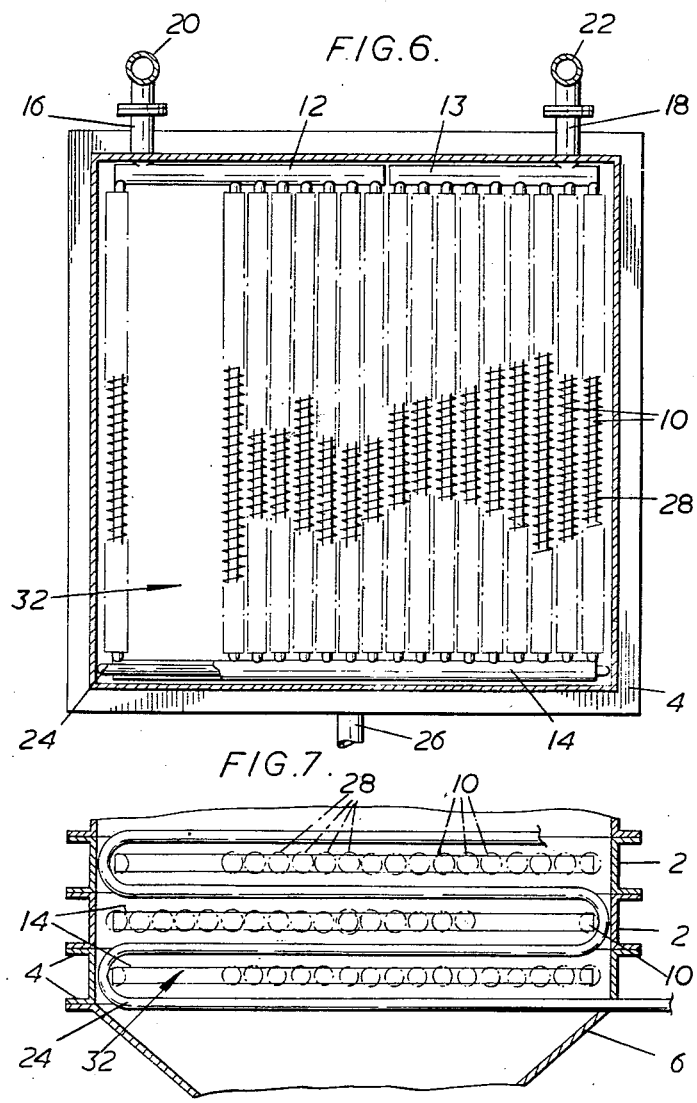

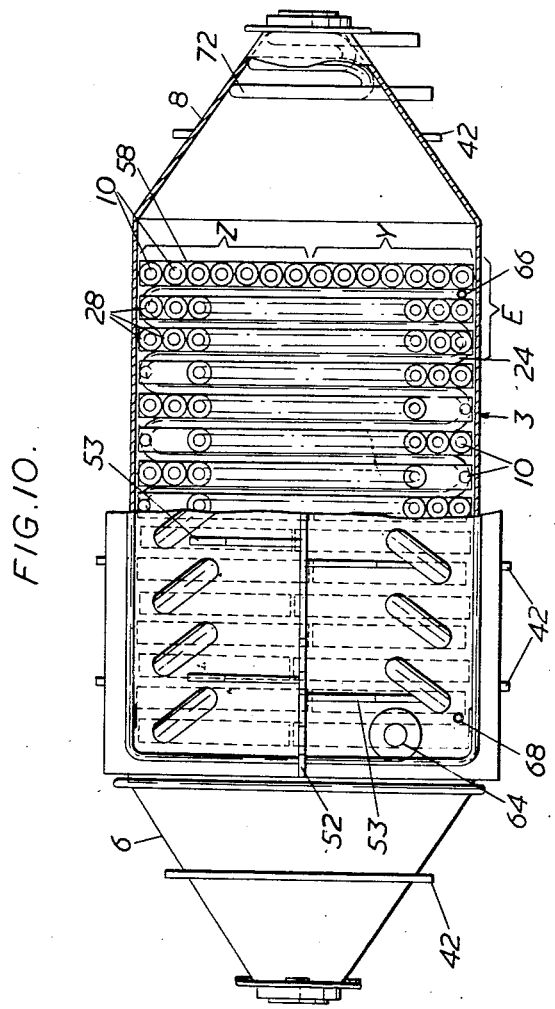

United States Patent Office 2,955,807
Patented Oct. 11, 1960

2,955,807

HEAT-EXCHANGE APPARATUS

Harry Lister Riley and John Norris, Handsworth, Sheffield, and Raiffe Greaves Coates, Kingsley, England, assignors to United Coke and Chemicals Company Limited, Treeton, near Rotherham, England, a British company Filed Aug. 2, 1954, Ser. No. 447,051

10 Claims. (Cl. 257—300)

This invention relates to condensers for condensing vapor to solids. It is sometimes advantageous to condense a vapor directly into the solid form. For example, phthalic anhydride is commonly produced as a vapor and leaves the reaction vessel mixed with other gases, and it may advantageously be recovered from this mixture by condensation as a solid.

In apparatus previously used the gas to be condensed has been passed longitudinally over tubes through which a cooling fluid is flowing. We have now found that much better condensation can be achieved by passing the gas transversely past the cooling tubes.

To produce maximum condensation it is advantageous to pass the gas through very narrow spaces between the cooling tubes, but we have found that considerable difficulties arise because these spaces become blocked by condensed solids.

It is the primary object of this invention to provide a condenser in which gas passes transversely past cooling tubes to be condensed into solid form in spaces between them.

A further object is to provide an improved condenser adapted to operate on a condensation and melting cycle in the recovery of phthalic anhydride or other material produced as a vapor.

Yet another object of the invention is to provide an improved process for recovering phthalic anhydride from a gaseous mixture.

Broadly stated, in a condenser according to this invention, tubes for cooling fluid are mounted in rows transversely to the direction of flow of the vapor in a casing having an inlet for vapor at one end and an outlet for uncondensed gas at the other. The tubes in each row are separated from one another by narrow spaces through which the vapor passes and are disposed so that in each row at least one gap larger than the narrow spaces is left. Because the spaces between the tubes are narrow, the gas to be condensed comes into contact with or flows very close to a cooling surface, and as the gas condenses the spaces become blocked. The gaps allow the flow to continue despite this blocking. These gaps must not be aligned with one another in the direction of flow, since if they were the gases would tend to pass through all of them instead of flowing through the spaces between the tubes. Accordingly the gaps are staggered in successive rows to force vapor flowing through a gap to flow transversely between the rows before reaching a gap in the next row.

The invention will be more readily understood by reference to the accompanying drawings, in which:

Figure 5 is a side elevation, partly broken away, of one form of condenser;

Figure 6 is a section on the line VI—VI in Figure 5;

Figure 7 is a part section on the line VII—VII in Figure 5;

Figure 8 is a side elevation, partly broken away of a second form of condenser;

Figure 9 is a part section on the line IX—IX in Figure 8, and

Figure 10 is a section on the line X—X in Figure 8.

Figure 1:
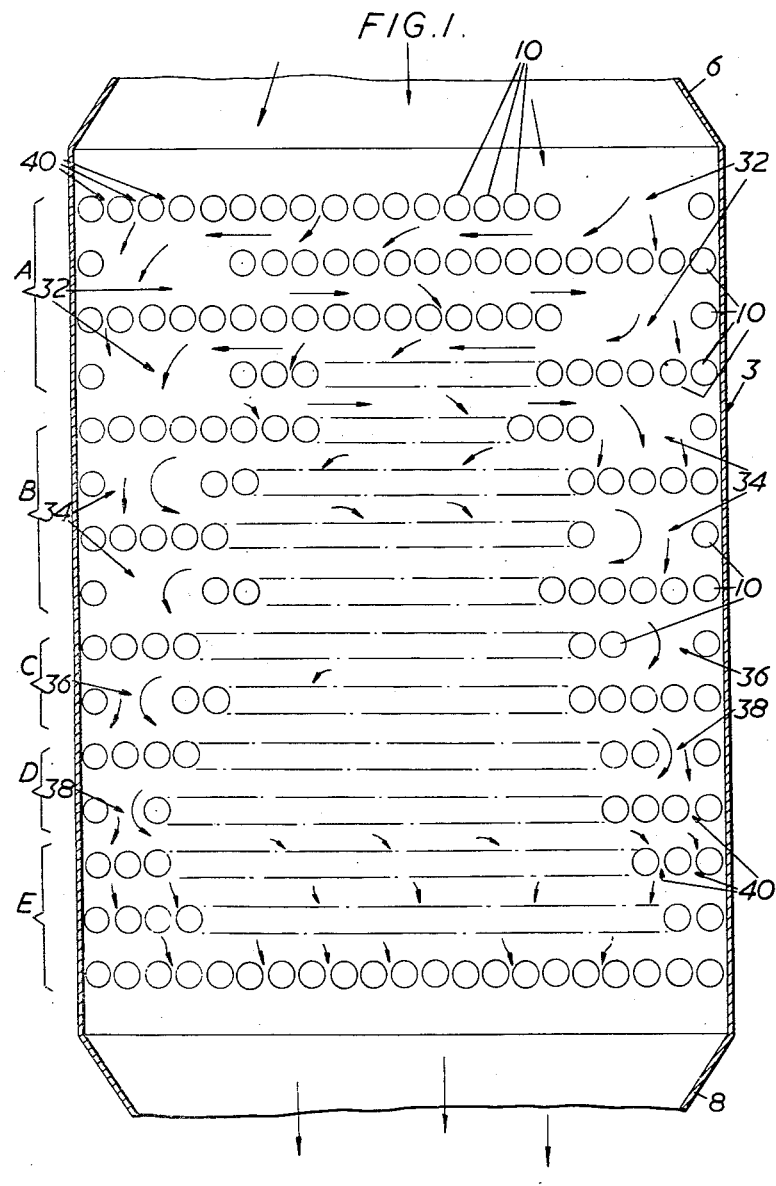
Figure 1 is a diagrammatic plan of a condenser showing the layout of the tubes.

Referring first to Figure 1, the condenser comprises a casing 3, rectangular in cross-section, with a tapering vapor inlet 6 and a tapering outlet 8. There are twelve rows of tubes 10 with gaps in the rows. The tubes are mounted with their axes transverse to the direction of vapor flow. In each row the tubes are spaced apart from one another by narrow spaces 40. In the first four rows A there are gaps 32 formed by the omission of four tubes, these being as shown at the opposite ends in successive rows. In the next four rows B there are gaps 34 formed by the omission of three tubes. In the next two rows C there are gaps 36 formed by the omission of two tubes, and in the last two rows D of the group of twelve rows there are gaps 38 formed by the omission of one tube.

In operation the gas tends to take the shortest path through the condenser and so in the main to flow through the narrow spaces 40. Any gas passing through the gap 32 in the first row will therefore tend to flow through the narrow spaces 40 in the second row, and so on. As the narrow spaces 40 in the first row become blocked, the bulk of the flow will take place through the gap 32 in that row and through the spaces 40 in the second row until those are blocked and so on. Naturally there is always some flow through the gap 32 in the first row, and the spaces 40 between the tubes in the second row begin to block up while there is still flow through those in the first row. Broadly, however, each row tends to become blocked in turn, so that, whereas initially there is substantially straight-line flow through the apparatus, after a time the flow is primarily from the gap 32 in the first row to that in the second row, and thereafter straight through the further rows; and a little later in the operation the flow from the gap in the second row is primarily to that in the third row and straight thereafter. This arrangement permits the condensation of a large amount of solid without building up an excessively high back-pressure.

Preferably the gap in one row is (as shown) close to the opposite end of the row from the gap in the next row, and so on. In this way the gas flowing from one row to the next has to flow between the rows over substantially the whole width of the row. Alternatively the first row can have the gap in the middle, the second row having a gap close to each end of the row and so on. The gaps can in fact be formed between the casing 3 and the end tubes in the rows, but this is not so desirable as it may lead to condensed solid building up on the wall of the casing.

We find that the spaces between the tubes, except for the gaps in the rows, should for most condensations be not greater than half an inch. Any space wider than this, for example, those necessitated by construction, should be baffled in some way, for example, with steel tape.

It is important that near the inlet end of the condenser there should be complete freedom of flow at all times, so large gaps are used here, as shown at 32. At any time throughout the operation the content of vapor to be condensed to solid decreases towards the outlet end of the condenser. For this reason the gaps may become progressively narrower towards the outlet end, and Figure 1 shows such decreasing gaps.

At the end of the condenser remote from the inlet we find that the presence of one or more additional rows of tubes without gaps can be of great value. By the time the gas reaches the twelfth row of tubes most of the vapor will have been condensed and the spaces between the tubes will not tend to block. By passing the gas through rows without gaps any last traces of uncondensed vapor will be thrown down by cooling, and at the same time these rows of tubes will act as filters to remove any solid particles suspended in the gas stream. Figure 1 shows three such rows E without any gaps at the outlet end.

It will be apparent that the precise design of the apparatus is not very important so long as the cooling surfaces are very close together and so long as when the spaces between the cooling surfaces are blocked there is still a free path for the gaseous mixture without creating undue back-pressure.

The axes of the tubes may be vertical or horizontal or at any other desired angle.

Figure 2:
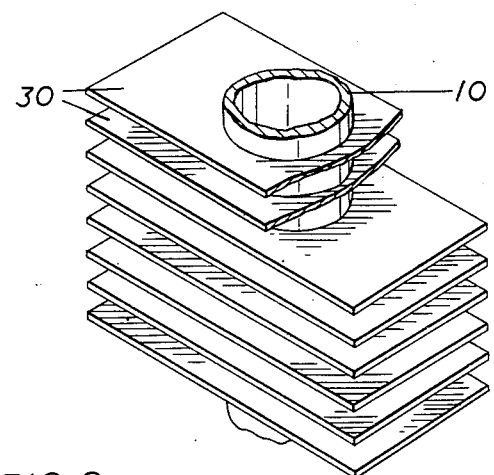
Figures 2, 3 and 4 are perspective views of various forms of tubes.
Figure 3:
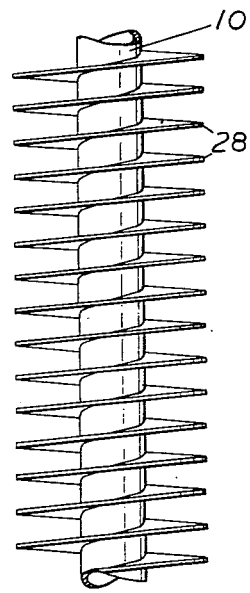
Figure 4:
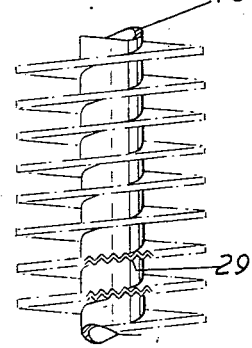

The narrowness of the spaces between the tubes carrying the cooling fluid promotes the transfer of heat to the cooling fluid from the vapor of the solid being condensed, and we have found that this heat transfer can be further increased by increasing the surface area of the tubes, for example, by providing the tubes with gills or fins. These can be flat plates arranged parallel with each other but at right angles to the axes of the tubes as shown at 30 in Figure 2, or can be in the form of helices arranged around the tubes, as shown at 28 in Figure 3. Helical surfaces can be corrugated as shown at 29 in Figure 4. The flow of the gas through the apparatus should be rendered as turbulent as possible and this turbulence can be assisted by making the fins on adjacent tubes in the rows abut against one another, so that the spaces between adjacent tubes are sub-divided. The tubes can have longitudinal ribs, provided that these are not so arranged that ribs on adjacent tubes meet and prevent any flow of the mixture through the spaces in the rows. Such longitudinal ribs are not as good as flat parallel plates such as 30, and these latter are not as good as helical cooling surfaces such as 28.

Another method of increasing the surface area and the turbulence of the flow is to wrap the tubes with wire gauze or netting.

Instead of forming gaps in the rows by omitting one or more tubes, fins or gills can be left off one or more of the tubes to form gaps.

In the construction of condenser shown in Figures 5 to 7, the rectangular part of the casing 3 is made up of a series of sections 2 which are joined together by means of bolts (not shown) passing through flanges 4 on each section. Accordingly a single section can be removed from the condenser for repair or replacement as a unit without shutting down the condenser for long periods, since the section can be immediately replaced by a spare section.

Each section of the condenser carries one of the rows of tubes 10, all the tubes having helical ribs 28. In each section, half the tubes are connected at the top to a manifold 12 and the other half to a manifold 13. All the tubes are connected at the bottom to a manifold 14. Cooling fluid is fed to the manifold 12 from a pipe 20 through a lateral pipe 16 and flows down through the tubes connected to it into the manifold 14. From this the fluid flows up the remaining tubes to the manifold 13 and out to a discharge pipe 22 through a lateral pipe 18. The pipes 20 and 22 serve all the rows of tubes.

The cooling fluid may be supplied and removed in other ways. For instance, manifolds may run longitudinally to connect corresponding tubes in each row. In any case the manifolds should, of course, be arranged so that there is substantially no passage for gas between them and the shell. The manifolds can be arranged in any convenient manner to make best use of the cooling properties of the fluid passing through the tubes; for instance, the fluid may pass in serpentine fashion through the rows of tubes and through the whole apparatus. Not only may the tubes in the rows be split up in the way shown in Figure 6, but so also may the rows themselves, i.e. groups of rows may be served by separate heating and cooling circuits.

Instead of making each section 2 form part of the casing 3, there may be a separate casing provided with slots in one side through which the rows of tubes built up as units can be inserted. The slots are then closed with lids which are tightly bolted into position.

Whatever the construction of the casing, it is desirable that its inlet 6 should taper so that the incoming gases spread outwards and are reduced in velocity before reaching the first row of tubes. The tapering outlet 8 leads to a discharge pipe (not shown) for the gases from which the condensed vapor has been removed. In other words, the casing preferably always is rectangular with two tapering ends.

The condensed solid must, of course, be periodically removed. This is most advantageously done by melting the condensed solid and removing it as a liquid. A heating fluid is passed through the tubes 10 at a temperature high enough for this purpose. The same fluid, e.g. oil, may be used at all times, being circulated alternately through cooling and heating systems as the apparatus is required to condense the vapour or melt the solid, or the pipes 20 and 22 may be connected alternately to circulating systems containing cold and hot fluids.

To melt the condensed solid there must, of course, be an adequate supply of heat to it. The solid that has condensed on the tubes and the gills or fins is readily melted, but any solid that condensed on the inner surface of the outer wall of the casing may tend to build up and remain unmelted. It is for this reason that it is undesirable to make any of the gaps between an end tube and the wall of the casing, but rather that each gap is preferably bounded by two tubes.

The condensed material, when molten, will run out of the narrow spaces 40 between the tubes down to the bottom of the casing. It may be removed through an outlet 26 in the bottom controlled by a valve not shown.

Since a quantity of the condensed solid will fall to the bottom forming a slurry with the molten solid and this slurry may block the outlet valve, it is advantageous to provide a further heating coil 24 lying at the bottom of the casing. This heating coil passes in serpentine fashion between the manifolds 14.

In the condenser shown in Figures 8 to 10 the rectangular casing 3 is made as a single unit with an open top from light-gauge steel which is strengthened by means of ribs 42 both round its body and round the inlet 6 and the outlet 8. The casing 3 has a flange 44 round the open side, on which rests a lid 46. This lid consists of a light sheet 48 strengthened round its edge by a flange 50 which cooperates with the flange on the casing 3 to form a gastight seal. The lid is strengthened by a longitudinal rib 52 and transverse ribs 53, the longitudinal rib 52 being provided with lifting lugs 54 so that the lid can be removed from the casing by a crane or similar lifting mechanism.

In this condenser all the tubes and associated parts are carried by the lid and so can be removed for repair by lifting the lid. As shown there are twelve rows of tubes 10, each row having a gap at alternate ends formed by omitting a single tube and having the tube next to the wall of the container without the helical fins 28 carried by the remainder of the tubes. In this way a larger gap is formed than would be obtained merely by omitting one tube. The last three additional rows of tubes E at the outlet end of the condenser do not have gaps.

The cooling fluid is introduced through a pipe 56 which is connected via a manifold to seven tubes Z in the last row of the condenser. The fluid flows down these tubes and is collected by a manifold 58 which transfers the fluid to the remaining seven tubes Y in the row, up which the fluid flows to be collected by the manifold 60. The fluid is then transferred by means of the connecting pipe 62 to the next row of tubes and so on through the condenser until it leaves through a pipe 64. The fluid thus flows in series through all the rows of the condenser. In the rows containing gaps, the manifolds at the top of the condenser connect the tubes in groups of six and seven alternately.

A heating coil 24 is provided in the bottom of the condenser to assist in removing the melted solid. The heating fluid is introduced into and removed from the coil by the pipes 66 and 68 respectively. The coil 24 is fastened to the tube structure at the bottom of the condenser as shown at 70. This maintains the coil in position and assists in the removal of it from the condenser together with all the tubes.

To ensure that solid vaporised during the melting step does not condense on the outlet end 8 of the condenser a further heating coil 72 is provided. Instead of having a heating coil in this form, the outlet can be electrically heated or the taper of the outlet end 8 can be adjusted so that the surface around the outlet is kept hot by heat from the tubes through which the hot fluid is flowing.

The heat required during the melting process is, of course, mainly that necessary to heat up the metal from which the condensers are made. Accordingly, the condensers should be well lagged and their construction made as light as possible in order to keep the heat capacity to a minimum.

Although in the condensers shown the gas flow is horizontal, the gases may flow vertically through a condenser having its inlet at the bottom and its outlet at the top or vice versa.

The invention is particularly useful in the condensation of phthalic anhydride. The usual method of condensing this is to allow the gases to flow through a series of large chambers, commonly called barns, in which both the gas velocity and the temperature are reduced, the latter to that required for the deposition of solid phthalic anhydride. The number and size of the barns employed depends, of course, on the size of the plant, but as many as seven barns are often used in series. To promote crystallisation it is desirable to provide metallic surfaces in the path of the flowing gases, and this is commonly done by hanging wire netting in some of the bars. The phthalic anhydride can be produced by the oxidation of naphthalene or orthoxylene, and the gases leaving the reaction vessel contain some water vapor, which also condenses when the temperature falls below the dew point of water in the gases, which is about 40° C. The condensed water reacts with the phthalic anhydride to form phthalic acid, which is highly corrosive. It is therefore necessary to construct one or more of the barns of corrosion-resistant material, which is usually stainless steel. The extraction of the phthalic anhydride from the barns gives rise to considerable difficulty, and in the past has generally been done by manual labour. Moreover, there is a considerable risk of explosion in barns of this type. By using condensers constructed as described above, we can avoid these drawbacks.

In condensing phthalic anyhdride it is important to provide the tubes with fins or gills as without these it is difficult to obtain sufficient cooling of the vapor to condense the phthalic anhydride. By increasing the surface area in this way, however, we can obtain substantially complete condensation as compared with incomplete condensation, which may be as low as 60% of the vapor, obtained with axial flow past cooling tubes.

The temperature in the free space of the condenser must be low enough to cause the phthalic anhydride to condense and be below the melting point of phthalic anhydride, which is 130.8° C. and should be above the dew point of the water vapor in the gas stream so that the amount of water condensing is at a minimum. Theoretically it would be desirable to work well above this dew point to avoid the condensation of any water at all, but we find that practically it is impossible to do this and that some water is always condensed. We have also found that as the temperature increases the phthalic anhydride hydrates more rapidly and the amount of phthalic acid which is formed increases. Moreover, the higher the temperature the higher is the vapor pressure of the phthalic anhydride. According, the temperature and rate of flow of the cooling fluid are adjusted so that the temperature of the uncondensed gas leaving the condenser is between 40 and 90° C. and for the best balance of the various factors referred to above the temperature is about 60° C.

Phthalic acid decomposes rapidly at 185° C. to yield the anhydride and water vapor again. Therefore the melting temperature should be above 185° C. and is preferably about 200° C. To remove the phthalic anhydride from the condenser the tubes are heated by steam under high pressure or by hot oil. Phthalic acid is very corrosive, attacking most metals, although stainless steel, which is the preferred constructional material for use in this invention, offers high resistance to attack.

In a plant in which phthalic anhydride or other vapor is produced continuously, it is necessary to use more than one condenser so that when melting is proceeding in one there is another available for the condensation. However, instead of two condensers, each large enough to take the whole volume of gas flowing from the reaction vessel, we prefer to use several condensers arranged in parallel, and at any one time more of these are being cooled (and thus acting as condensers) than are being heated (and thus acting as melting apparatus for the condensed solid). We find eight a convenient number of apparatus to use, with five acting as condensers and three as melting apparatus, but of course the number may vary. As the melting process is more rapid than the condensing process, the whole plant can be kept in operation practically continuously, whereas with only two large condensers, one or other is idle for a considerable proportion of the time during which the plant is operating. A further advantage of using smaller condensers is that the thermal expansions and contractions due to alternate heating and cooling of the apparatus are less.

As an example, the gases resulting from the oxidation of naphthalene with air in the presence of a catalyst were introduced at a temperature of 192° C. into a condenser as shown in Figures 8 to 10. The rate of flow of the gases was one linear foot per second through the condenser. Oil was introduced into the last row of tubes E at a temperature of 40° C. and flowed in series through all the rows of tubes, that is to say, in general countercurrent to the gases. The rate of flow of the oil was adjusted to ensure that the temperature of the uncondensed gases leaving the condenser was 50° C. Initially the pressure drop across the condenser was no more than 0.1 inch of mercury, but after flow had taken place for 3½ hours this had increased to 2.1 inches of mercury. At the end of this period the gas flow was stopped and the cool oil replaced by hot oil at a temperature of about 200° C. This hot oil flowed for about 40 minutes while the phthalic anhydride was allowed to run out of the condenser as it melted. The amount of phthalic anhydride obtained was 15 lbs. per cubic foot of the volume of the condenser casing.

We claim:

1. A condenser for condensing flowing vapor into solid form comprising a casing having a vapor inlet at one end and an uncondensed gas outlet at the other end, and a plurality of cooling fluid tubes mounted across said casing at right angles to the direction of flow from said inlet to said outlet in a plurality of rows, the tubes in each row being spaced from each other and the walls of said casing by a distance which when open permits the flow of gases through the row and which will become closed by deposits of solidified condensed vapors, at least one gap in each row having a width equal at least to the diameter of one tube which cannot become closed by deposits of solidified vapors, and the gaps in successive rows being staggered with respect to each other.

2. A condenser according to claim 1 in which there is a single gap in each row and the gaps are adjacent the opposite ends of successive rows.

3. A condenser according to claim 1 in which the tubes carry fins.

4. A condenser according to claim 1 in which the gaps decrease in width from said inlet to said outlet.

5. A condenser according to claim 1 having a heating coil mounted at the bottom of said casing.

6. A condenser according to claim 1 in which said casing is rectangular and said inlet and outlet are tapering.

7. A condenser for condensing flowing vapor into solid form comprising a casing having a vapor inlet at one end and an uncondensed gas outlet at the other end, a first plurality of cooling fluid tubes mounted across said casing at right angles to the direction of flow from said inlet to said outlet in a plurality of rows, the tubes in each row being spaced from each other and the walls of said casing by a distance which when open permits the flow of gases through the row and which will become closed by deposits of solidified condensed vapors, at least one gap in each row having a width equal to at least the diameter of one tube which cannot become closed by deposits of solidified vapors, the gaps in successive rows being staggered with respect to each other, and a second plurality of cooling fluid tubes mounted parallel to said first rows and between said first rows and said outlet and being devoid of gaps.

8. A condenser according to claim 7 in which all said tubes are connected to fluid supply and discharge manifolds across each said row.

9. A condenser according to claim 8 in which said tubes in each said row are in two groups, the tubes in said first group being connected at one end to said supply manifold and the tubes in said second group being connected at the corresponding end to said discharge manifold, all said tubes being connected at the opposite end to a transfer manifold.

10. A condenser for condensing flowing vapor into solid form comprising a casing having a vapor inlet at one end and an uncondensed gas outlet at the other end, a plurality of groups of tubes mounted in said casing with their axes transverse to the direction of vapor flow and spaced apart a distance less than the diameter of each tube, the first group of tubes adjacent said vapor inlet having a gap by the omission of four tubes, the second group of tubes having a gap by the omission of three tubes, the third group of tubes having a gap by the omission of two tubes, the fourth group of tubes having a gap by the omission of one tube, the gaps in adjacent rows being at the opposite ends with respect to each other, and the final group of tubes next to the gas outlet being without a gap.

References Cited in the file of this patent

UNITED STATES PATENTS

| | | |
|---|---|---|
| 163,706 | Wells | May 25, 1875 |
| 1,382,670 | Price | June 28, 1921 |
| 1,654,190 | Primrose | Dec. 27, 1927 |
| 1,677,901 | Nelis | July 24, 1928 |
| 1,713,534 | Kirgan | May 21, 1929 |
| 1,849,057 | Dean | Mar. 15, 1932 |
| 1,853,236 | Shadle | Apr. 12, 1932 |
| 1,966,632 | Larkin | July 17, 1934 |
| 2,402,881 | Fausek et al. | June 25, 1946 |
| 2,455,314 | Pietzsch | Nov. 30, 1948 |
| 2,583,013 | Patterson | Jan. 22, 1952 |